UNITED STATES PATENT OFFICE.

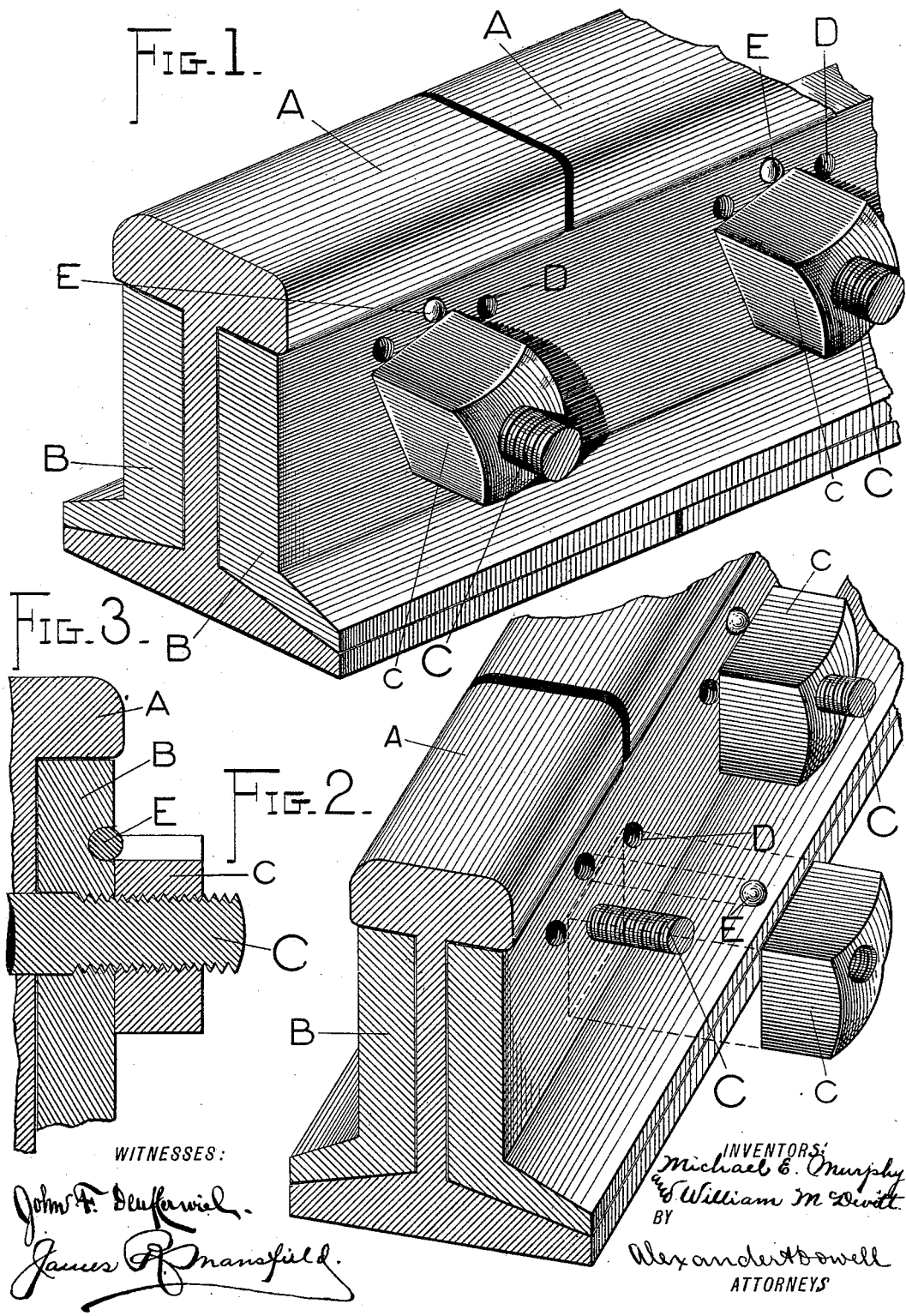

MICHAEL E. MURPHY AND WILLIAM McDEVITT, OF LEBANON, PENNSYLVANIA.

NUT-LOCK.

SPECIFICATION forming part of Letters Patent No. 595,962, dated December 21, 1897.

Application filed March 6, 1897. Serial No. 626,250. (No model.)

*To all whom it may concern:*

Be it known that we, MICHAEL E. MURPHY and WILLIAM McDEVITT, of Lebanon, Lebanon county, Pennsylvania, have invented certain new and useful Improvements in Nut-Locks; and we hereby declare that the following is a full, clear, and exact description thereof, reference being had to the accompanying drawings, which form part of this specification.

This invention is an improved nut-lock, especially adapted for fish-plate joints of railways, but of such simple construction as to be readily applicable elsewhere.

It consists, essentially, in forming or providing a small semiglobular pocket or pockets near the end of the bolt-opening, against which the nut on the bolt is to seat and in such position as to be partly overlaid by the nut on the bolt when screwed home, and into this recess is forced a metal ball, which projects sufficiently above the surface against which the nut is screwed to prevent the unscrewing of the nut, while it is in turn held in the recess by the nut.

The invention as applied to a fish-plate joint of railways is clearly shown in the accompanying drawings, in which—

Figure 1 is a perspective view of a fish-plate joint of a railway, showing our improved nut-lock applied thereto. Fig. 2 is a perspective view illustrating the bolt and nut and the nut-locking devices detached and their relative positions. Fig. 3 is a detail transverse section showing the nut in locked position.

Referring to the drawings, A A represent the meeting ends of the rails, B the fish-plate, C C two of the usual bolts, and c c the nuts on the ends of the bolts, all of ordinary or other suitable construction. In the fish-plates, around the bolt-openings therein, are formed one or more pockets or recesses D D, which are preferably semiglobular, but should each be adapted to receive and hold snugly a small metal ball E. These pockets may be made by a punch, if desired, after the nut is in place or may be made in the plate beforehand and could be conveniently made simultaneously with the punching of the bolt-holes therein. The pockets are made at such a distance from the bolt-holes that when the nut is screwed on its corners will pass over the pockets. The nut is screwed home tightly until one of its corners has just cleared or almost cleared one of the pockets. Then a ball E is forced into the pocket, so that it partly underlies the nut, and the ball projects sufficiently to prevent the nut unscrewing, while at the same time it is held in the pocket by the overlying edge of the nut, as shown. Thus the ball locks the nut and the nut keeps the ball in place.

The simplicity of the device does not detract from its utility and durability and enables the lock to be applied easily in almost any place where a nut is to be fastened without expensive tools and without making an unsightly appearance.

For a fish-plate lock pockets three-sixteenths of an inch in diameter and a ball one-fourth of an inch in diameter are effective.

Having thus described our invention, what we therefore claim as new, and desire to secure by Letters Patent thereon, is—

In a nut-lock, the combination of the bolt and nut, a body having a recess or recesses therein within the radius of the nut, and a ball-fastening seated within the pocket and compressed between the overlying surface of the body and nut to lock the nut, all substantially as and for the purpose set forth.

In testimony that we claim the foregoing as our own we affix our signatures in presence of two witnesses.

MICHAEL E. MURPHY.
WILLIAM McDEVITT.

In presence of—
SAMUEL J. ADAMS,
EMANUEL GALLAGHER.